Oct. 29, 1968 E. LEMKE 3,408,535
RASTER CORRECTION CIRCUIT
Filed May 17, 1966
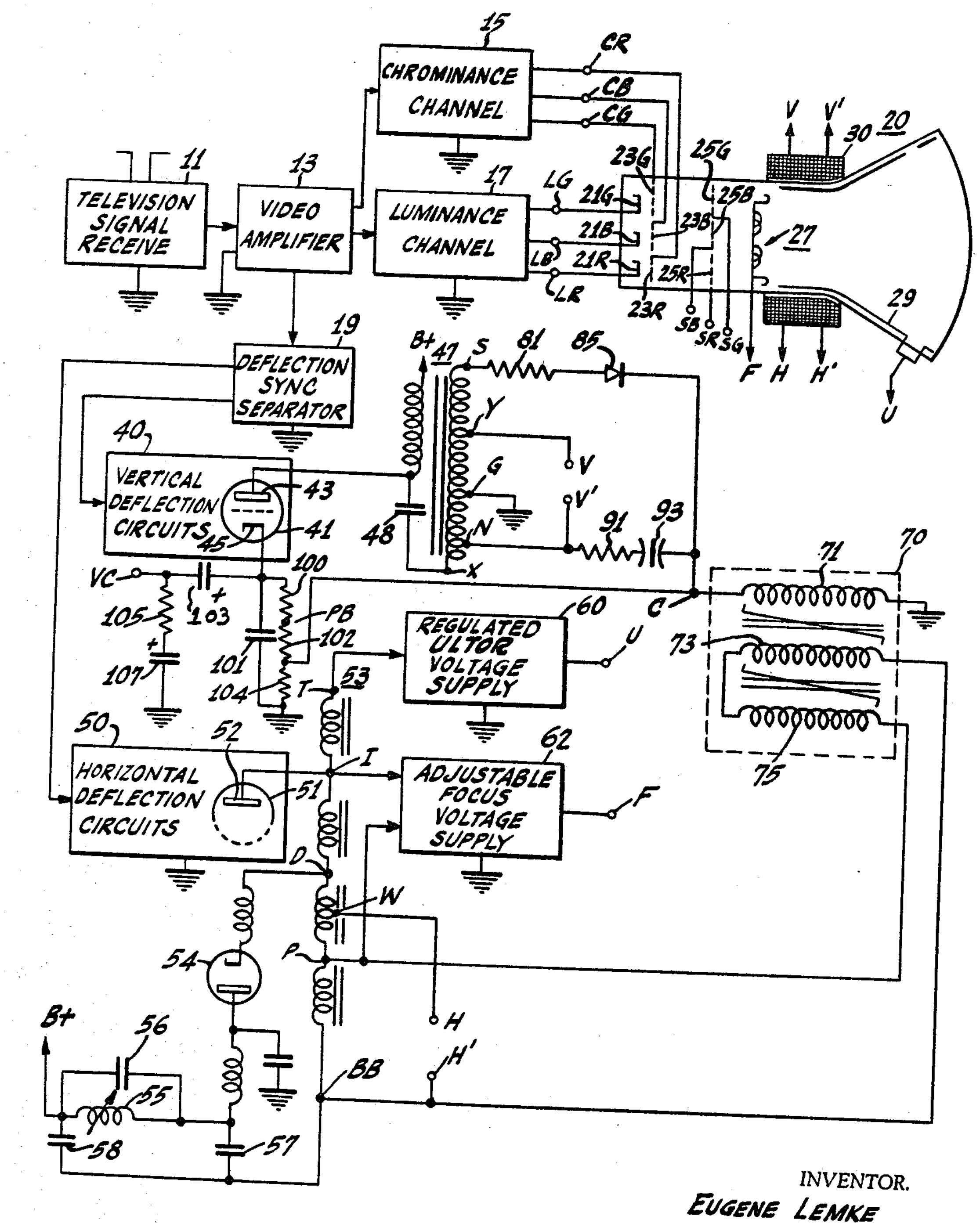
INVENTOR.
EUGENE LEMKE
BY William H. Meagher
Attorney 3,408,535
RASTER CORRECTION CIRCUIT
Eugene Lemke, Indianapolis, Ind., assignor to Radio Corporation of America, a corporation of Delaware
Filed May 17, 1966, Ser. No. 550,710
4 Claims. (Cl. 315—27)

The present invention relates generally to circuits for correcting undesired distortion of the scanning raster of a cathode ray tube; in particular, circuitry in accordance with the present invention may be employed to advantage in correcting raster distortion of the so-called "pincushion" type as encountered, for example, in the operation of wide-angle, multi-gun color kinescopes.

The RCA CTC 17 color television receiver, described in the RCA Service Data Pamphlet designated 1964—No. T12 employs a tri-gun, shadow mask color kinescope with which a relatively wide deflection angle (90°) is associated in operation of the device. The nature of the deflection yoke specifications found appropriate in order to provide the desired wide angle deflection of the multiple beams of the color kinescope result in the development of a scanning raster suffering from a distortion of the "pincushion" type. Such distortion is characterized by the width of the raster varying from top to bottom, with minimum width at the picture middle and maximum width at both top and bottom, as well as variable raster height from side to side, with maximum height at left and right edges and minimum height at the picture center.

To overcome the side pincushion aspect of this undesired raster distortion, the CTC 17 receiver employs saturable reactor apparatus effectively functioning as a dynamic width control, introducing compensating width variations from raster top to raster bottom, in order to produce a corrected raster with essentially straight sides. The present invention is directed to an improvement of such saturable reactor apparatus.

In accordance with an embodiment of the present invention, the side pincushion correction function is achieved through use of a two-window core form of saturable reactor structure, having a control winding energized by an appropriately shaped field rate current, and having a pair of serially connected output windings shunted across a selected winding segment of the horizontal deflection transformer. The desired control winding current waveform is obtained through the cooperation of a plurality of contributing effects including:

(a) Derivation of an essentially parabolic voltage waveform from the cathode circuit of the vertical deflection output tube;

(b) Derivation of a clipped sawtooth voltage waveform from the vertical deflection output transformer;

(c) Derivation of a vertical flyback pulse voltage waveform (peaking in the same direction as the clipped sawtooth waveform) from the vertical output transformer; and (d) Integration of a combination of the above-described voltage waveforms by the inductive control winding.

A fixed amount of direct current is also passed through the control winding for biasing purposes, the vertical output tube cathode circuit also serving as the source for this bias current. The effect of the above-described operation is to provide a vertical rate of parabolic variation of the current delivered from the horizontal output transformer to the horizontal coils of the deflection yoke to eradicate the undesired side pincushioning distortion.

A primary object of the present invention, accordingly, is the provision of novel and improved apparatus for effecting raster distortion correction.

A particular object of the present invention is to provide relatively simple circuitry and structure for side pincushion correction in a color television receiver.

Other objects and advantages of the present invention will be readily recognized by those skilled in the art upon a reading of the following detailed description and an inspection of the accompanying drawing which illustrates, in combined block and schematic form, color television receiver apparatus wherein correction of side pincushioning is effected in accordance with an embodiment of the present invention.

In the drawing, a color television receiver is illustrated, which may, for example, be of the general form of the above-mentioned RCA CTC 17 color television receiver. Block representations for a number of major segments of the receiver are employed for the purpose of simplifying the drawing; however, pertinent portions of the receiver's deflection circuitry, together with pincushion correction circuitry in accordance with an embodiment of the present invention, are illustrated in schematic detail.

The receiver input segment, represented by the block 11, labelled television signal receiver, selects a radiated color television signal, converts the selected modulated RF signal to intermediate frequencies, amplifies the resultant modulated IF signal, and, by detection of the IF signal, recovers a composite color video signal, i.e., it may comprise the usual lineup of tuner, IF amplifier and video detector. The composite color video signal output of receiver 11 is supplied to a video amplifier 13, from which is derived inputs for the receiver's chrominance channel 15, luminance channel 17, and deflection sync separator 19.

The chrominance channel 15, shown only in block form, may comprise the usual circuitry associated with proper recovery of color-difference signal information from the modulated color subcarrier which is a component of the composite color video signal output of video amplifier 13. Such circuitry generally comprises a bandpass amplifier for selectively amplifying the color subcarrier and its sidebands, a suitable array of synchronous detectors for demodulating the color subcarrier and matrix circuits for suitably combining the detector outputs to obtain a set of color-difference signals of the appropriate form for application to the receiver's color image reproducer. To effect the desired synchronous detection of the color subcarrier, there will be associated with the chrominance channel detectors a local source of oscillations of subcarrier frequency and reference phase, as well as means for phase synchronizing this local oscillation source in accordance with the reference information of the burst component of the composite color video signal.

The red, blue and green color-difference signal outputs of the chrominance channel 15 appear at respective output terminals CR, CB and CG, which are directly connected to the respective control grids, 23R, 23B and 23G, of the red, blue and green electron guns of a color kinescope 20, which is of the well-known tri-gun, shadow-mask type.

This color-difference signal drive of color kinescope 20 is complemented by the application of luminance information to the respective cathodes 21R, 21B and 21G of color kinescope 20. Luminance channel 17, which may, in its usual form, comprise suitable wideband amplifier means for amplifying the luminance signal component of the composite color video signal processed by video amplifier 13, develops luminance signal outputs at respective output terminals LR, LB and LG for direct application to the respectively kinescope cathodes 21R, 21B, and 21G. Desirably, the luminance channel 17 may include means for adjusting the relative amplitudes of the luminance signal outputs appearing at the respective output terminals, for color balance purposes.

The color kinescope 20 additionally includes: individual screen grid electrodes 25R, 25B and 25G for the respective red, blue and green electron guns, each screen grid electrode being supplied with an operating D.C. potential (desirably individually adjustable) at the appropriate one of the energizing terminals SR, SB and SG; focusing electrode structure 27 for the electron gun trio, subject to common energization via the output terminal F of an adjustable D.C. source to be described subsequently; and ultor (final accelerating) electrode structure 29, adapted to operate at a high voltage, supplied thereto via the output terminal U of a high voltage supply, also to be subsequently described.

Associated with the color kinescope 20 is a deflection yoke 30 for developing magnetic beam deflection fields within the kinescope to cause the kinescope beams to trace a scanning raster on the kinescope's viewing screen. The deflection yoke 30 incorporates respective horizontal and vertical deflection windings, which, upon energization with deflection currents of appropriate frequencies and waveshapes, will provide the respective line and field rate deflections of the kinescope beams desired for raster development. The horizontal deflection windings of yoke 30 are connected between terminals H and H' in the receiver's horizontal deflection circuitry, while the vertical deflection windings of yoke 30 are connected between terminals V and V' in the receiver's vertical deflection circuitry. To appreciate the manner in which the yoke windings are energized via the noted terminals, a detailed consideration of certain portions of the deflection circuitry is now in order.

The deflection sync separator 19, in response to an output of video amplifier 13, separates the deflection synchronizing components from the remainder of the received composite color video signal. The sync separator 19 supplies a vertical sync pulse output to the vertical deflection circuits 40, and a horizontal sync pulse output to the horizontal deflection circuits 50. No attempt has been made to illustrate in complete schematic detail all of the elements of the vertical and horizontal deflection circuits; rather, block representations have been employed, with only a partial schematic showing of the output or driving device for each of the circuits. However, schematic details of the output circuit elements associated with said driving devices, which elements serve in the actual transfer of energy between the respective driving devices and the respective yoke windings, have been shown, since the instant invention is directly associated with these elements.

The partially illustrated driving device of the vertical deflection circuits 40 in the vertical output tube 41. The output tube 41 includes an anode electrode 43, connected to a source of anode potential, provided by the receiver's B+ supply (not illustrated), via the primary winding of a vertical output transformer 47. The output tube 41 also includes a cathode electrode 45, which is returned to a point of reference potential (e.g., chassis ground) by means of the series combination of a trio of cathode resistors 100, 102 and 104. Shunting this series combination is a capacitor 101. The cathode 45 is also coupled by means of an electrolytic capacitor 103 to a terminal VC (from which a dynamic vertical convergence waveform is derived for use in the receiver's convergence circuitry, not illustrated); the series combination of a resistor 105 and an electrolytic capacitor 107 is connected between terminal VC and ground (for convergence waveshaping purposes).

A net effect of the cathode circuit components referred to above is to develop at the cathode electrode 45 a voltage of a substantially parabolic waveshape, the resultant of integration of the sawtooth current wave flowing in output tube 41. A voltage divided sample of this waveform is developed at the junction resistors 102 and 104. As will be described in more detail subsequently, this voltage at the junction of resistors 102 and 104 is used in conjunction with additional voltage sources to obtain a driving waveform for the pincushion correction circuitry. To this end, the junction is directly connected to the control voltage input terminal C of the correction apparatus 70; a control winding 71, to be subsequently described, is connected between terminal C and ground.

The additional driving voltage sources for control winding 71 are associated with the secondary winding of the vertical output transformer 47. The vertical windings of the deflection yoke 30 are connected between a pair of intermediate terminals Y and N on the transformer secondary winding, as indicated by the direct connection of yoke terminals V and V' to the respective transformer terminals Y and N. A tap G on the secondary winding, located between the yoke driving terminals Y and N, is grounded. The end terminals of the secondary winding are designated S and X, respectively. By virtue of the grounding of the intermediate tap G, the voltage developed at end terminal S will be in phase opposition to the voltage developed at the yoke driving terminal N. In particular, for the purposes of the illustrated circuit, the poling of the transformer windings is such as to cause the scanning voltage waveform (comprising a sawtooth component rising to a peak in one direction, and a retrace pulse component peaking in the opposite direction) at end terminal S to be of a polarity such that the retrace pulse component is negative-going.

A resistor 81 and a diode 85 are connected in series between transformer end terminal S and the control voltage input terminal C of correcting apparatus 70. The poling of diode 85 is such that its cathode is directly connected to terminal C; i.e. diode 85 is poled such that it blocks the retrace pulse component of the waveform at terminal S. As a consequence, diode 85 will be nonconducting during the retrace interval and a portion of the beginning-of-trace interval, but will conduct during an end-of-trace interval. Thus, a clipped voltage component will be developed at terminal C through the action of diode 85, the component essentially consisting of a positive-going sawtooth voltage, occupying an end-of-trace interval.

An additional voltage component will be developed at terminal C due to the coupling of transformer terminal N thereto via the series combination of a resistor 91 and a capacitor 93. The voltage waveform appearing at terminal N is a relatively attenuated, opposite-polarity version of the waveform developed at the end terminal S. Thus, it comprises a positive-going retrace pulse, together with a negative-going sawtooth component of reduced amplitude relative to the amplitude of the positive-going sawtooth component clipped by diode 85. The relative amplitudes will be determined bp the location of the grounded transformer tap G (that is, in accordance with the turns ratio between the N–G and S–G transformer winding sections).

The composite of the above-described pair of voltage components derived from transformer 47 consists of a somewhat delayed and flattened positive-going retrace pulse, occupying a relatively narrow beginning-of-trace interval, and a positive-going sawtooth, occupying a relatively wide end-of-trace interval. With proper turns ratio choice, the delayed retrace pulse component will have a peak amplitude of the order of the peak amplitude of the positive-going clipped sawtooth component; with such a turns ratio choice, the effect of a negative-going sawtooth contributed by the resistor 91-capacitor 92 path will be relatively insignificant (effectively only lessening, to a small degree, the amplitude of the positive-going sawtooth component passed by diode 85).

At terminal C, the parabolic voltage component developed at the junction of resistors 102 and 104 will be combined with the composite voltage described above. The resultant current in the inductive control winding 71 has a waveshape that is an integrated version of the combined voltage waveform developed at terminal C. The energy distribution in the combined voltage waveform is such that integration thereof provides a current waveform in the desired shape of an asymmetrical parabola (i.e., a parabola with a trough occurring earlier than the middle-of-trace). Due to the nature of time delay effects in the operation of saturable reactor apparatus, such an asymmetrical parabolic variation in the control winding current will result in symmetrical parabolic variation of the impedance of the controlled winding, now to be described.

In the simple, two-window core form, which the saturable reactor 70 may conveniently assume per a preferred embodiment of the present invention, the controlled reactor winding comprises a pair of essentially identical, serially connected winding sections 73 and 75. The winding sections 73 and 75 are separately wound on the respective outer core legs of the reactor which lie parallel to the central core leg (on which the control winding 71 is wound). The end terminals of the series combination of controlled winding sections are directly connected to terminals (P and BB) of the horizontal output transformer 53, to be subsequently described. The winding direction for the respective sections on the outer core legs are chosen with relation to the direction of horizontal frequency current through the respective winding sections such that the component of horizontal flux which would tend to be introduced in the central core leg due to the horizontal current in one winding section will be cancelled in the central core leg by an equal but opposite direction flux component due to the horizontal current in the other controlled winding section. However, the vertical rate current flowing in the control winding 71 will produce flux components in both outer core legs that will introduce similar changes in the impedances presented by the respective controlled winding sections 73 and 75. A magnetic biasing point for the outer core legs is established by the flow of a direct current component through the control winding 71. This direct current component is derived from the cathode circuit of the vertical output tube 41; i.e., the direct connection of terminal C to the junction of resistors 102 and 104 permits a selected portion of the cathode current of the tube 41 to flow in the control winding 71, establishing a desired saturation condition in the outer core legs of the reactor.

To appreciate the manner in which the impedance variations of the controlled winding sections 73 and 75 affect horizontal scanning, attention should now be directed to the illustrated portion of the horizontal deflection system, including the partially illustrated output tube 51 of the deflection circuits 50. The anode 52 of the horizontal output tube 51 is connected to the input terminal I of the horizontal output transformer 53. Transformer 53 provides a step-down auto-transformer coupling between output tube 51 and the horizontal windings of yoke 30; the auto-transformer primary comprises the entire winding section extending between input terminal I and the low potential end terminal BB of the transformer, while the auto-transformer secondary winding comprises that segment of the primary which extends between terminal BB and an intermediate terminal W.

In accordance with the well known reaction scanning and power recovery principals, damper circuitry is also associated with transformer 53. The cathode of a damper diode 54 is connected to a transformer tap D, intermediate the transformer terminals I and W, while the damper diode anode is connected to a source of B+ potential via a direct current path including a variable inductor 55, serving familiar linearity or efficiency control purposes. A pair of B-boost capacitors (57 and 58) couple the respective ends of coil 55 to the low potential end terminal BB of transformer 53. A capacitor 56 in shunt with coil 55 permits a degree of flexibility in the selection of the particular values of the B-boost capacitors 57 and 58, for optimum deflection linearity and/or efficiency.

Transformer 53 also serves as a source of flyback pulses for the voltage supplies associated with the ultor and focus electrodes 29 and 27, respectively, of the color kinescope 20. Flyback pulses of stepped-up amplitude relative to those developed at output tube anode 52 appear at the high potential end terminal T of transformer 53 and are fed to a regulated ultor voltage supply 60 for delivery of a stable supply voltage to the ultor terminal U. An adjustable focus voltage supply 62, serving to energize the focus electrodes 27 via terminal F, receives a pair of pulse inputs comprising an intermediate amplitude pulse derived from terminal I, and a low amplitude pulse derived from a transformer tap P located at an intermediate point on the W–BB secondary winding segment.

As previously noted, the series combination of controlled winding sections 73 and 75 of the reactor 70 is shunted across the P–BB section of transformer 53. In a dynamic manner, analogous to the static effect of the familiar shunt width coil, the recurring, vertical rate variations of the impedance of winding sections 73 and 75 modulate the amplitude of the horizontal sawtooth current delivered to yoke 40.

The winding sections 73 and 75 represent a variable load "competing" with the yoke for delivery of sawtooth current; when the impedance presented by the winding sections decreases they draw more current, thus decreasing the current supplied to yoke 30, and vice versa. By virtue of the recurring, vertical rate, parabolic variation of the impedance of this "competing" load, the side pincushion distortion of the raster on the kinescope 30 is effectively eliminated.

A comparison between the side pincushion correction arrangement of the present invention and that employed in the aforementioned CTC 17 receiver reveals a significant degree of simplification provided by the present invention. A simple, two-window core is employed for the saturable reactor herein, whereas the CTC 17 reactor employed a four-window core. The simpler core construction permits use of a reduced number of gaps in the magnetic circuit, permitting a sufficient degree of manufacturing control, so that provision of a fixed D.C. bias may be confidently relied upon to establish correct magnetic biasing points. The expense of a D.C. bias adjustment control, present in CTC 17 arrangement, is thus avoided.

Sensitivity of the reactor apparatus in the present invention is reduced relative to that employed in the CTC 17 receiver, in the sense that a greater magnitude of parabolic variation of the control winding current is required to produce a given degree of distortion correction. This is primarily due to two factors: (a) the above-noted gap reduction, and (b) the use of shunt control alone, in contrast with the combination series-shunt control employed in the CTC 17 arrangement. However, as may be appreciated from the foregoing description, a solution to the problem of greater drive requirements may be obtained conveniently by allowing parabolic variations in the voltage at the vertical output tube cathode to supplement the driving waveforms derived from the vertical output transformer. The connection between the vertical output tube cathode circuit and the control winding, serving to provide bias current for the reactor, may be also employed to convey the supplementary parabolic voltage component. Indeed, a saving in circuit components may be realized through the use of this dual function coupling, since the necessity of filtering at the bias supply terminal is eliminated.

In a particular working embodiment of the present invention, pertinent circuit component values were in accordance with the following table, which is set forth by way of example only:

| | | |
|---|---|---|
| Resistor: | | |
| 81 | ohms | 150 |
| 91 | do | 220 |
| 100 | do | 680 |
| 102 | do | 1000 |
| 104 | do | 470 |
| 105 | do | 180 |
| Capacitor: | | |
| 48 | microfarads | .0033 |
| 93 | do | 5 |
| 101 | do | .047 |
| 103 | do | 50 |
| 107 | do | 25 |
| Diode 85 | | Type IN3194 |
| Triode 43 | | Type 6GF7(½) |

What is claimed is:

1. In a television receiver comprising a deflection yoke having respective vertical and horizontal deflection windings, a horizontal deflection system including a horizontal output transformer serving as a source of horizontal scanning current for said horizontal deflection winding, and a vertical deflection system including a vertical output tube, having respective anode and cathode circuits, and a vertical output transformer, driven by said anode circuit and serving as a source of vertical scanning current for said vertical deflection winding;
   side pincushion correction apparatus comprising the combination of:
   a saturable reactor including a control winding and a controlled winding, the impedance of said controlled winding varying in response to changes in current through said control winding:
   means connecting said controlled winding to said horizontal output transformer for causing any of said variations of the impedance of said controlled winding to modulate the amplitude of the scanning current traversing said horizontal deflection winding;
   means for deriving from said vertical output transformer a periodic voltage waveform of vertical frequency;

means included in said vertical output tube cathode circuit for developing a substantially parabolic voltage of vertical frequency in response to the cathode current of said vertical output tube;
   and means applying a combination of said vertical frequency voltage waveform derived from said vertical output transformer and said parabolic voltage derived from said cathode circuit to said control winding for causing the impedance of said controlled winding to so vary as to produce pincushion correcting changes in said horizontal scanning current amplitude.

2. Apparatus in accordance with claim 1 wherein said control winding appears sufficiently inductive at said vertical frequency as to effect integration of said voltage combination to produce a resultant control winding current waveshape in the form of an asymmetrical parabola.

3. Apparatus in accordance with claim 1 wherein said saturable reactor includes a two-window core having a central core leg upon which said control winding is wound, and a pair of outer core legs upon which substantially identical segments of said controlled winding are wound, the directions of winding of said segments and the relative directions of horizontal frequency currents therethrough being chosen so as to promote cancellation of horizontal frequency flux in said central core leg.

4. Apparatus in accordance with claim 1 wherein said voltage combination applying means includes a direct current conductive coupling between said output tube cathode circuit and said control winding, said coupling additionally serving to utilize at least a portion of the cathode current of said vertical output tube to electromagnetically bias said saturable reactor.

References Cited

UNITED STATES PATENTS

| | | | |
|---|---|---|---|
| 2,906,919 | 9/1959 | Thor et al. | 315—24 |
| 3,346,765 | 10/1967 | Barkow | 315—27 |

RODNEY D. BENNETT, *Primary Examiner.*

M. F. HUBLER, *Assistant Examiner.*